US009286315B2

(12) United States Patent
Berkebile et al.

(10) Patent No.: US 9,286,315 B2
(45) Date of Patent: Mar. 15, 2016

(54) RESOLVING SYNCHRONIZATION CONFLICTS BASED ON STATE INFORMATION

(71) Applicant: Apollo Group, Inc., Phoenix, AZ (US)

(72) Inventors: Locke David Berkebile, Alamo, CA (US); Isabel George, Foster City, CA (US); David Le, San Jose, CA (US); Manish Upendran, San Jose, CA (US); Ted Wong, San Francisco, CA (US); Sravanthi Deshmukh, Milpitas, CA (US); Jongwoo Lee, San Francisco, CA (US)

(73) Assignee: Apollo Education Group, Inc., Phoenix, AZ (US)

( * ) Notice: Subject to any disclaimer, the term of this patent is extended or adjusted under 35 U.S.C. 154(b) by 563 days.

(21) Appl. No.: 13/653,445

(22) Filed: Oct. 17, 2012

(65) Prior Publication Data

US 2014/0108498 A1 Apr. 17, 2014

(51) Int. Cl.
*G06F 15/16* (2006.01)
*G06F 17/30* (2006.01)

(52) U.S. Cl.
CPC .............................. *G06F 17/30174* (2013.01)

(58) Field of Classification Search
CPC ........................................................ G06F 17/30
See application file for complete search history.

(56) References Cited

U.S. PATENT DOCUMENTS

| 2004/0122870 | A1* | 6/2004 | Park et al. ...................... 707/201 |
| 2006/0277223 | A1* | 12/2006 | Gupta et al. .................. 707/201 |
| 2008/0114716 | A1* | 5/2008 | Mock ................................ 707/1 |
| 2008/0313172 | A1* | 12/2008 | King ...................... G06F 17/241 |
| 2009/0313552 | A1* | 12/2009 | Vasudevan ........... G06F 17/2235 715/751 |
| 2009/0327358 | A1* | 12/2009 | Lukiyanov et al. ........... 707/203 |
| 2010/0211543 | A1* | 8/2010 | Knight et al. .................. 707/617 |
| 2011/0029594 | A1* | 2/2011 | Owen Rees ........... G06F 17/243 709/203 |
| 2015/0199411 | A1* | 7/2015 | Greenspan .......... G06F 17/2288 715/229 |

* cited by examiner

*Primary Examiner* — Brian J Gillis
*Assistant Examiner* — Amy Ling
(74) *Attorney, Agent, or Firm* — Hickman Palermo Becker Bingham LLP

(57) ABSTRACT

Techniques are described for resolving document change conflicts based on state information. A document management system records, at a client device, changes that a user made to a root client-side instance of a document bundle to create a modified client-side instance of the document bundle, wherein the changes were made while the client device was not connected to a remote storage service. After the changes are recorded, the client device is connected to the remote storage service. In response to determining that a conflict has occurred, the document management system selects a particular resolution action, based, at least in part, on state information associated with at least one of: a user that made the changes, an instance of the document bundle, or the client device on which the changes were made. The document management system then resolves the conflict by performing the particular resolution action.

31 Claims, 5 Drawing Sheets

210 — HOMEWORK #1 QUESTIONS
PROFESSOR QUARK    JAN 16, 2012 AT 08:15 AM

DOES ANYONE HAVE ANY QUESTIONS ABOUT HOMEWORK ASSIGNMENT #1?

220 — RE: HOMEWORK #1 QUESTIONS
ANDREW SMITH    JAN 16, 2012 AT 04:23 PM

CAN YOU POST THE HOMEWORK ASSIGNMENT ON THE WEB PAGE, PLEASE?

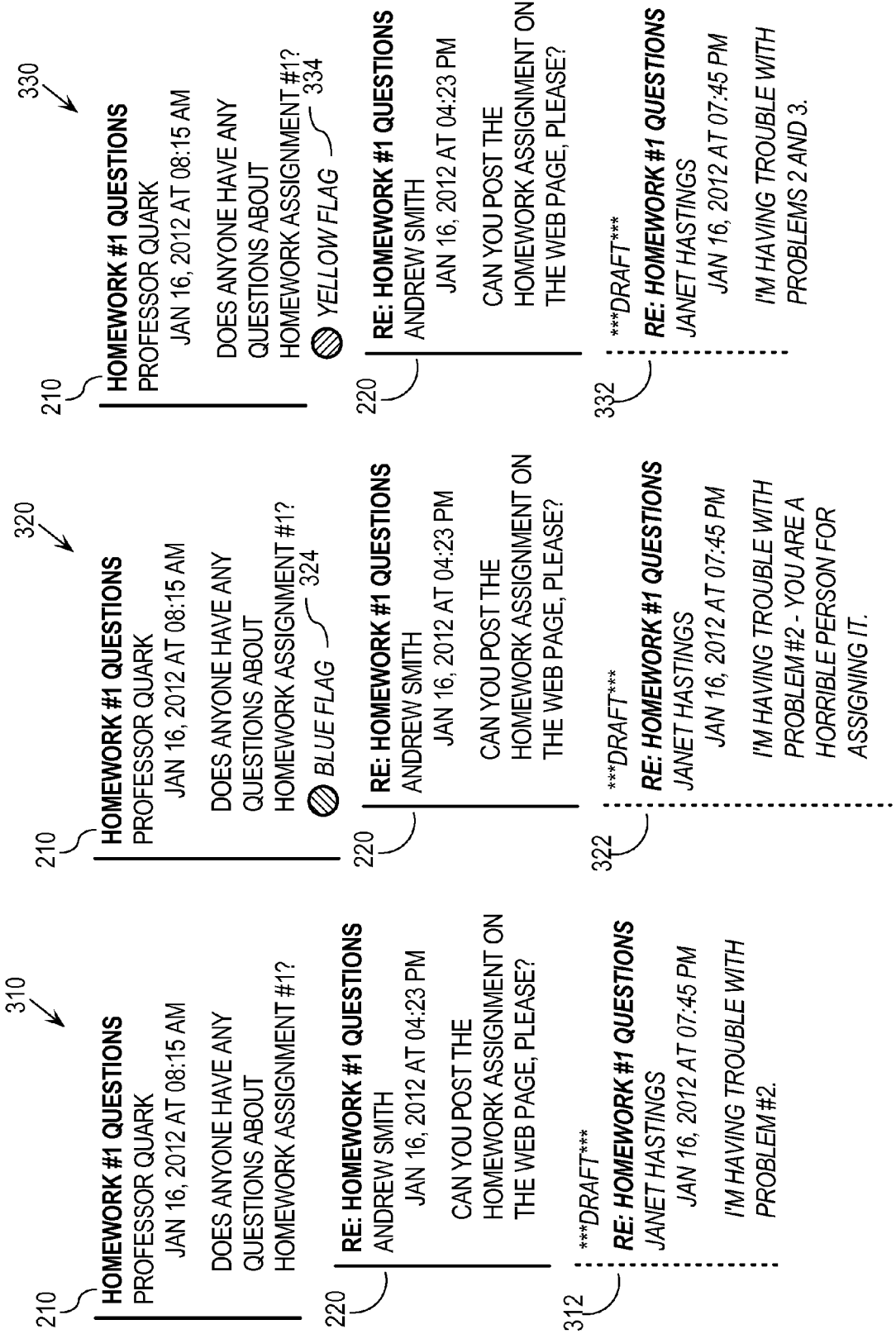

FIG. 4

402 — RECORD, AT A CLIENT DEVICE, CHANGES THAT ARE MADE TO A ROOT CLIENT-SIDE INSTANCE OF A DOCUMENT BUNDLE TO CREATE A MODIFIED CLIENT-SIDE INSTANCE OF THE DOCUMENT BUNDLE, WHEREIN THE CHANGES WERE MADE WHILE THE CLIENT DEVICE WAS NOT CONNECTED TO A REMOTE STORAGE SERVICE

404 — CONNECT THE CLIENT DEVICE TO THE REMOTE STORAGE SERVICE AFTER THE CHANGES ARE RECORDED

406 — DETERMINE WHETHER A CONFLICT HAS OCCURRED BY DETERMINING WHETHER INFORMATION FOR THE SERVER-SIDE INSTANCE OF THE DOCUMENT BUNDLE MATCHES INFORMATION FOR THE ROOT CLIENT-SIDE INSTANCE OF THE DOCUMENT BUNDLE

408 — IN RESPONSE TO DETERMINING THAT A CONFLICT HAS OCCURRED BECAUSE THE INFORMATION FOR THE SERVER-SIDE INSTANCE OF THE DOCUMENT BUNDLE DOES NOT MATCH THE INFORMATION FOR THE ROOT CLIENT-SIDE INSTANCE OF THE DOCUMENT BUNDLE, SELECT A PARTICULAR RESOLUTION ACTION, OF A PLURALITY OF AVAILABLE RESOLUTION ACTIONS, BASED, AT LEAST IN PART, ON STATE INFORMATION ASSOCIATED WITH AT LEAST ONE OF: A USER THAT MADE THE CHANGES, AN INSTANCE OF THE DOCUMENT BUNDLE, OR THE CLIENT DEVICE ON WHICH THE CHANGES WERE MADE; WHEREIN THE PLURALITY OF AVAILABLE RESOLUTION ACTIONS INCLUDE AT LEAST: CHANGING THE SERVER-SIDE INSTANCE OF THE DOCUMENT BUNDLE TO MATCH THE MODIFIED CLIENT-SIDE INSTANCE OF THE DOCUMENT BUNDLE, AND LEAVING THE SERVER-SIDE INSTANCE OF THE DOCUMENT BUNDLE UNCHANGED

410 — RESOLVE THE CONFLICT BY PERFORMING THE PARTICULAR RESOLUTION ACTION

RESOLVING SYNCHRONIZATION CONFLICTS BASED ON STATE INFORMATION

FIELD OF THE INVENTION

The present invention relates to resolving document conflicts, and, more specifically, to resolving conflicts for document text and metadata based on state information.

BACKGROUND

Online forums in which users may post and review messages are becoming increasingly popular. An online forum allows users to draft and post messages, respond to posted messages, and may allow a user to make changes to posted messages (such as flagging a posted message or deleting a message that the user authored). Such online forums are generally run for a particular purpose, e.g., as part of a support group, as a question and answer forum, as a discussion board for online education, etc.

Many users participate in online forums via multiple client computing devices. For example, a particular user may have both a laptop computer and a tablet computer on which the user reviews, modifies, and creates new messages for a particular online forum. Because these client devices may not be constantly connected to a network through which the online forum is accessible, the software used to access the online forum may be designed to maintain a client-side instance of messages from the online forum. Further, the software may provide a mechanism by which the user may modify the client-side instance of a posted message or a draft of a new message, while the user's device is offline.

Changing a message offline can create synchronization issues at the online forum. For example, a user may make some offline edits (changes X) to an instance of a message on the laptop computer, and different offline edits (changes Y) to another instance of the same message on the tablet computer. If the user attempts to causes both sets of edits to be propagated to the instance of the message that resides at online forum, a conflict occurs. Possible resolutions to such a conflict include but are not limited to:

keep changes X and discard changes Y,
keep changes Y and discard changes X,
attempt to keep both changes (though in some situations the changes may be mutually exclusive),
create a second online copy of the message, where the first copy reflects changes X and the second copy reflects changes Y
raise an error without making any changes
request the user to specify which changes should be kept in the online instance of the message While there are many possible ways to resolve the conflict, it can be difficult to determine which resolution is appropriate in any given situation. Further, the example given above is merely one way a conflict can occur. There are any number of situations that may result in conflicting offline updates to the same message, which can be equally difficult to resolve.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts a discussion thread in an example online forum.

FIG. 3 depicts a series of edited versions of the discussion thread of FIG. 2.

FIG. 4 depicts a flowchart for saving offline changes to a client-side instance of a document bundle and then resolving conflicts identified for the changed document bundle.

DETAILED DESCRIPTION

Figure 1:
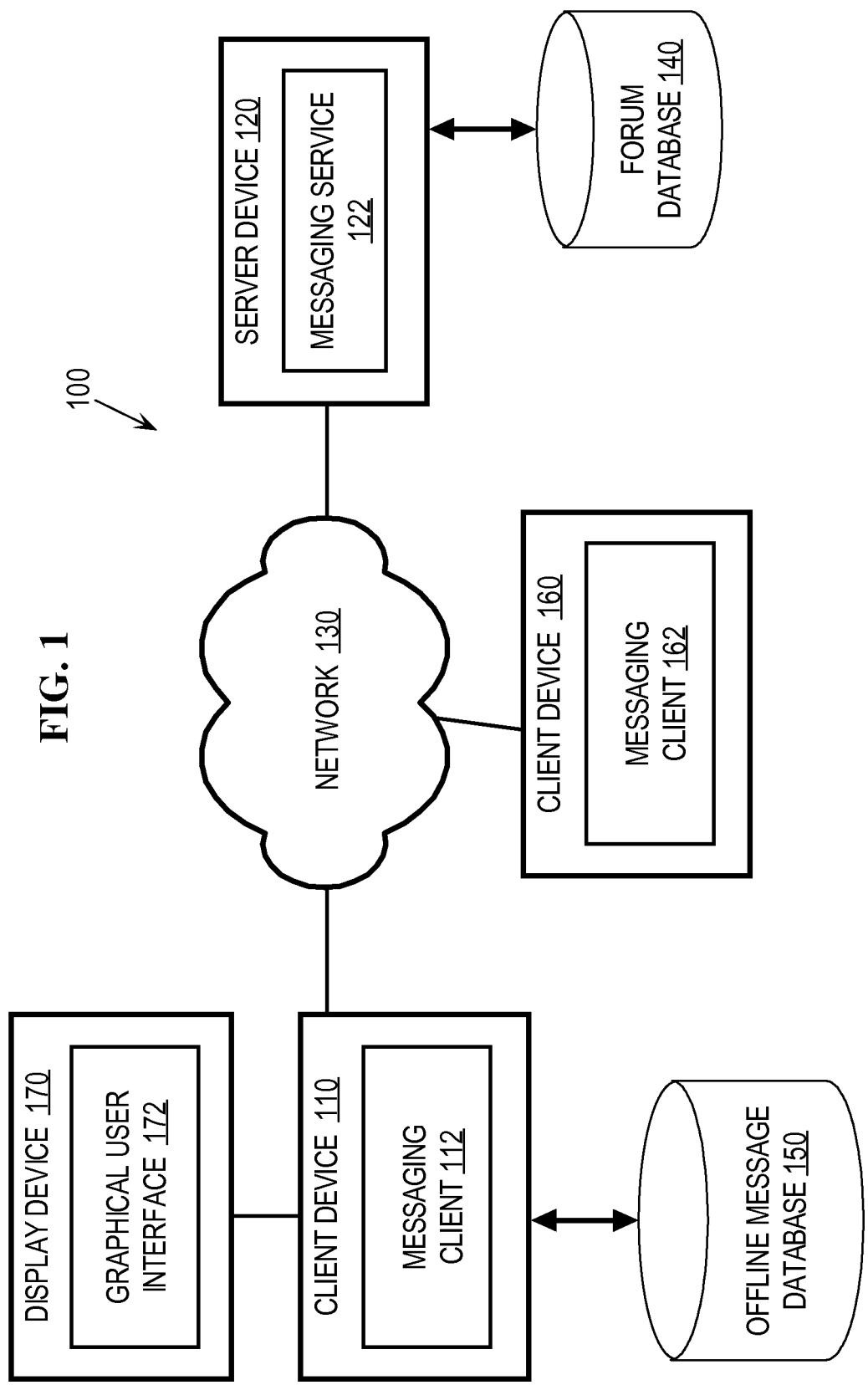
FIG. 1 is a block diagram that depicts an example network arrangement for resolving message conflicts.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As explained above, when documents are maintained at a remote storage service that allows multiple client devices to make changes to the documents, conflicts may arise when users perform offline edits to the documents. Techniques are described herein for automatically determining how to resolve such conflicts based on state information.

Conflicts may occur when offline changes are made to a document itself, or to metadata associated with the document. Such metadata may include, for example, a rating of the document, flags associated with the document, a category attribute of the document, etc. For the purpose of explanation, a document and its associated attributes shall be referred to herein collectively as a "document bundle" or "dBDL". Thus, both modifications to a document itself, and modifications to metadata associated with the document, qualify as changes to the dBDL of the document.

Further, a dBDL may represent any kind of data with associated metadata. For example, a particular dBDL represents a particular preference setting for a user profile with associated metadata, including a timestamp representing when the preference was last changed and a flag indicating whether the value of the preference setting is the default value. Other examples of dBDLs represent data for user profiles, syllabus and course materials, grades and assignments, solicitations, contracts for faculty, etc.

The version of a dBDL that exists on a client device when the client device disconnects from an online document service is referred to herein as the "root client-side instance" of the dBDL. Offline edits made at the client are initially made to the root client-side instance of the dBDL. After any change has been made to the root client-side instance of the dBDL, that instance ceases to be a "root" instance because the instance is no longer the version of the dBDL that existed when the client device disconnected from the online document service.

Typically, the root client-side instance of a dBDL matches the server-side instance of the dBDL that was current at the time the client went offline. However, after the client goes offline, the client-side instance and the server-side instance may diverge in response to (a) offline changes made at the client, (b) changes made by another client that are propagated to the server-side instance, or (c) both.

In one embodiment, conflicts are handled by recording, at the client, offline changes that a user makes to the root client-side instance of a dBDL. Such changes create a modified client-side instance of the dBDL. After the changes are recorded, the client device is connected to the remote storage service that maintains the server-side instance of the dBDL.

After the client device has reconnected with the remote storage service, the document management system determines whether a conflict has occurred by determining whether the server-side instance of the dBDL matches the root client-side instance of the dBDL. If the two instances do not match, a conflict has occurred. Specifically, both the client-side instance and the server-side instance have changes that were made after the client device went offline.

In response to determining that a conflict has occurred, the document management system selects a particular resolution action, of a plurality of available resolution actions, based, at least in part, on state information. The state information that is used to select the particular resolution action may include, for example:

state information associated with the user that made the changes,
state information associated with an instance of the dBDL,
state information associated with the client device on which the changes were made.

The plurality of available resolution actions include at least: changing the server-side instance of the dBDL to match the modified client-side instance of the dBDL; and leaving the server-side instance of the dBDL unchanged. The document management system then resolves the conflict by performing the particular resolution action.

Performing Edits Offline

Edits may be considered as performed "offline" when the client device used to make the edits was not connected to a data network, when data access from a messaging service that manages the server-side copies of documents becomes unreliable, when the messaging service is not able to process data in time to provide an adequate user experience, etc. A messaging client at the client device may not be able to access the messaging service, e.g., due to a system or network outage, network conditions such as the client device passing through a tunnel that prevents reliable data reception, updates being performed at the messaging service, etc.

Further, a messaging client may effectively go offline because data and resource usage on the client device may be high enough to prevent the messaging client to receive or process data adequately. For example, the messaging client may not have sufficient resources, such as battery power, available CPU, etc., when a user runs a resource-intensive application in conjunction with running the messaging client. Examples of resource-intensive applications include games, video streaming applications, etc.

Further, the messaging client may operate in an offline state because a user explicitly set the messaging client or client device to an offline state (such as "airplane" mode). It is to be appreciated that the above examples of device and application conditions that may cause a messaging client to move to a offline state are non-limiting.

Message Synchronization Architecture

An example messaging client may reside on a client device. The messaging client may identify resolution actions to resolve message conflicts discovered when synchronizing messages that have been edited offline. FIG. 1 is a block diagram that depicts an example network arrangement 100 for resolving message conflicts, according to embodiments.

Network arrangement 100 includes a client device 110, a client device 160, and a server device 120 communicatively coupled via a network 130. Server device 120 is also communicatively coupled to a forum database 140 and client device 110 is communicatively coupled to an offline message database 150 and a display device 170. Example network arrangement 100 may include other devices, including client devices, server devices, and display devices, according to embodiments.

Client devices 110 and 160 may be variously implemented by any type of computing device that is communicatively connected to network 130. Example implementations of client device 110 and client device 160 include, without limitation, workstations, personal computers, laptop computers, personal digital assistants (PDAs), tablet computers, cellular telephony devices, and any other type of computing device.

In network arrangement 100, client device 110 is configured with a messaging client 112. Messaging client 112 may be implemented in any number of ways, including as a stand alone application, as a plug-in to a browser (which may also be implemented on client device 110), as a component of a stand alone application, etc. A browser running on client device 110 may be configured to interpret and display web pages received over network 130, such as Hyper Text Markup Language (HTML) pages, and eXtensible Markup Language (XML) pages, etc. Client device 110 may be configured with other mechanisms, processes and functionalities, depending upon a particular implementation.

An offline message database 150 is communicatively coupled to client device 110 and may be implemented by any type of storage system capable of storing message information. Offline message database 150 may reside in any type of storage, including volatile and non-volatile storage such as random access memory (RAM), one or more hard or floppy disks, main memory, etc. The storage on which offline message database 150 resides may be external or internal to client device 110. In one embodiment, offline message database 150 stores information about dBDLs.

A display device 170 is communicatively coupled to client device 110 and may be implemented by any type of device capable of displaying a graphical user interface (GUI) 172, the information for which is supplied by messaging client 112. Example implementations of display device 170 include a monitor, a screen, a touch screen, a projector, a light display, a display of a tablet computer, a display of a telephony device, a television, etc.

In network arrangement 100, client device 160 is configured with a messaging client 162. Messaging client 162 is configured in the same way as messaging client 112 described herein. Client device 160 may be communicatively coupled with a display device (not shown in FIG. 1) and an offline message database distinct from offline message database 150 (also not shown in FIG. 1), which are configured to function as the corresponding components described in connection with client device 110.

Network 130 may be implemented with any type of medium and/or mechanism that facilitates the exchange of information between client devices 110 and 160, and server device 120. Furthermore, network 130 may use any type of communications protocol, and may be secured or unsecured, depending upon the requirements of a particular embodiment.

Server device 120 may be implemented by any type of computing device that is capable of communicating with client devices 110 and 160 over network 130. In network arrangement 100, server device 120 is configured with messaging service 122. Messaging service 122 may be part of a cloud storage service, according to embodiments. Further, messaging service 122 is configured to communicate information for messages associated with one or more online forums with messaging client 112.

Messaging service 122 may receive and respond to Application Programming Interface (API) calls from messaging client 112, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication from messaging client 112. Further, messaging service 122 may send one or more of the following over network 130 to messaging client 112: information via HTTP, HTTPS, SMTP, etc.; XML data; SOAP messages; API calls; and other communications according to embodiments. Messaging service 122 may be implemented by one or more logical modules, and is described in further detail below. Server device 120 may be configured with other mechanisms, processes and functionalities, depending upon a particular implementation.

Server device 120 is communicatively coupled to forum database 140. Forum database 140 may reside in any type of storage, including volatile and non-volatile storage including random access memory (RAM), one or more hard or floppy disks, or main memory. The storage on which forum database 140 resides may be external or internal to server device 120. In one embodiment, forum database 140 stores information for dBDLs used by messaging service 122.

Drafting and Posting Messages in an Online Forum

Messaging service 122 manages information for at least one example online forum. For purposes of illustration, the example online forum for which messaging service 122 manages information is described as part of an online college course. However, embodiments are not limited to online college courses.

In the example online forum, one or more users from multiple devices (which include, e.g., client devices 110 and 160 from FIG. 1) may add and manipulate messages arranged in message discussion threads. Message instances may have associated metadata, which may include one or more of:
- a user identifier for a user that authored the message,
- a user identifier for a user that last changed the message,
- a timestamp representing when the message was changed last,
- a timestamp representing when the message was authored,
- a type of device on which the message was last changed,
- a unique identifier for the dBDL for the message,
- a unique instance identifier for the instance of the dBDL,
- information for a root message instance,
- a subject of the message,
- a unique identifier of a posted message to which the message is a reply,
- flags (e.g., "substantive", "unsubstantive", "helpful", "inappropriate", a colored flag, "important", etc.),
- keywords for the message, etc.

An identifier may be a sequence of alphanumeric characters, or any other information that uniquely identifies an entity.

A discussion thread is created when an initiating message is posted to an online forum by a user of the online forum. FIG. 2 depicts a discussion thread 200 in an example online forum. Discussion thread 200 includes an initiating message 210 from a faculty member that solicits questions, about a pending homework assignment, from participants of discussion thread 200 (who include students of the course, at least one other faculty member, and teacher's assistants). Discussion thread 200 also includes a message 220 that responds to message 210.

To participate in the online forum, a user logs in to messaging client 112 using authentication information that uniquely identifies the user, e.g., through GUI 172. Messaging client 112 may communicate the authentication information with messaging service 122 and receive, from messaging service 122, information from forum database 140 that is needed to display the forum content that the authenticated user is authorized to view.

For example, a particular user at client device 110 authenticates with messaging client 112. The particular user is authorized to view discussion thread 200, and messaging client 112 receives, from messaging service 122, any updated information for discussion thread 200 that is needed to update discussion thread 200 stored at offline message database 150. Messaging client 112 also sends any change information stored at offline message database 150 that was recorded while messaging client 112 was not connected to messaging service 122, e.g., because either client device 110 or server device 120 did not have access to network 130 at the time. Any conflicts are identified and resolved during the initial exchange of information between messaging client 112 and messaging service 122, as described in connection with flowchart 400 of FIG. 4 below.

FIG. 3 depicts a series of edited versions of discussion thread 200, i.e., discussion threads 310, 320, and 330. Discussion thread 310 depicts a set of edits to discussion thread 200 made by client device 110. For the purposes of discussion, it shall be assumed that, after being made at client device 110, a successful sync operation between client device 110 and server device 120 has caused the changes of discussion thread 310 to be saved at both offline message database 150 and forum database 140 without conflict.

Discussion threads 320 and 330 depict additional edits performed offline to the messages depicted in discussion thread 310 subsequent to the sync operation. These additional offline edits may have been performed by different users, or by the same user on two different client devices. In the example illustrated in FIG. 3, the revised discussion threads 320 and 330 both include revisions to the draft message created by Janet Hastings. Consequently, it is likely that revised discussion thread 320 reflects offline changes made by a user (Janet Hastings) on one device, while the revised discussion thread 330 reflect offline changes made by the same user using a different device.

After the initial sync operation, each message in discussion thread 310 has both a client-side instance of the dBDL and a server-side instance of the dBDL, both of which have the same dBDL identifier. For the purposes of discussion, the client-side instance of the dBDL for message 312 shall be referred to as dBDLv1, while the server-side instance of the dBDL for message 312 shall be referred to as dBDLv2.

In one embodiment, messaging service 122 stores dBDLv2 at forum database 140. Messaging client 112 stores a dBDLv1 at offline message database 150 to enable the user to view and/or change messages in discussion thread 310 without having to be connected to messaging service 122. While there is a connection between messaging service 122 and messaging client 112, the client-side instance and the server-side instance of the dBDL for each message in discussion thread 310 kept in sync.

As depicted in discussion thread 310 of FIG. 3, the authenticated user begins drafting a draft message 312 replying to initiating message 210 of discussion thread 310 while messaging client 112 is connected to messaging service 122. Thus, draft message 312 is saved to both offline message database 150 by messaging client 112 (as dBDLv1) and to forum database 140 by messaging service 122 (as dBDLv2).

Draft message 312 may be saved at offline message database 150 and forum database 140 through an autosave initiated by messaging service 122 or messaging client 112, or through the user explicitly saving the draft. Draft message 312 has not yet been posted, and is therefore not viewable by any user other than the author of the draft.

For the purpose of illustration, assume that after draft message 312 is saved, the connection is lost between messaging client 112 and messaging service 122. Because dBDLv1 is the client-side instance that exists at the time device 110 goes offline, dBDLv1 is the root client-side instance of the dBDL for message 312.

While the user is offline, or in other words, while messaging client 112 is not connected to messaging service 122 via network 130, the user may make changes to the client-side instances of the dBDLs for discussion thread 310. For example, the user may edit the text of draft message 312, may add or edit metadata for message 210 and/or message 220, may change metadata associated with discussion thread 310, etc. Such changes are saved to client-side instances of data stored for discussion thread 310 while the user is offline. For example, a revised client-side dBDL dBDLv3 would be created at offline client device 110 if the user uses the offline client device 110 to revise dBDLv1.

Changing Message Data while Offline

FIG. 4 depicts a flowchart 400 for saving offline changes to a client-side instance of a dBDL and then resolving conflicts identified for the changed dBDL. Unless explicitly indicated, the steps of flowchart 400 may be performed in any order, according to embodiments.

At step 402, when a client device is offline, changes that are made to a root client-side instance of a dBDL are recorded, at the client device, to create a modified client-side instance of the dBDL. For the purpose of explanation, it shall be assumed that messaging service 122 is the remote storage service referred to in flowchart 400. According to another embodiment, a cloud storage service, of which messaging service 122 is a part, is the remote storage service referred to in flowchart 400.

When a user first changes the client-side instance of a dBDL while offline, the user changes the root instance of the dBDL to a modified instance of the dBDL (which is now different from the server-side instance of the dBDL). Messaging service 122 maintains the server-side instance of the dBDL (i.e., dBDLv2). For example, modifying dBDLv1 while offline creates dBDLv3, which no longer matches dBDLv2.

According to the example of FIG. 3, the root instances of messages 210, 220, and 312 are depicted in discussion thread 310. To illustrate step 402, an authenticated user of client device 110 edits client-side information for discussion thread 310 (stored at offline message database 150) while messaging client 112 is not connected to messaging service 122. These changes are illustrated by discussion thread 320 of FIG. 3. As shown in discussion thread 320, the authenticated user edits the text of draft message 312 to state "I'm having trouble with problem #2—you are a horrible person for assigning it.", as reflected in modified draft message 322. The authenticated user also edits message 210 to include a blue flag 324 in the metadata for message 210 of discussion thread 320. Messaging client 112 records the appropriate changes to the root client-side instances of the dBDLs for messages 210 and 312, respectively, to produce modified instances of the dBDLs for messages 210 and 322 in offline message database 150.

Identifying Message Conflicts

The remote storage service of FIG. 4 allows multiple client devices to make changes to the server-side instance of the dBDL. For example, both client device 110 and client device 160 maintain messaging clients to communicate changes to server-side instances of dBDLs stored at forum database 140. Messaging service 122 responds to communications from messaging client 162 at client device 160 in the manner described in connection with messaging client 112.

At step 404, the client device connects to the remote storage service after the changes are recorded. Continuing with the example above, messaging client 112 at client device 110 connects to messaging service 122 after messaging client 112 records the modified client-side instances of the dBDLs for messages 210 and 312 (reflected in discussion thread 320 at messages 210 and 322, respectively) at offline message database 150.

At step 406, it is determined whether a conflict has occurred by determining whether the server-side instance of the dBDL matches the root client-side instance of the dBDL. Server-side instance of the dBDL does not match the root client-side instance of the dBDL, then some other client has caused the server-side instance to change after client-device 110 went offline.

According to an embodiment, determining whether a conflict has occurred is performed automatically in response to the client device establishing a connection with the remote storage service. For example, messaging client 112 determines whether a conflict has occurred, for the messages in offline message database 150 that have changed while messaging client 112 was offline, automatically in response to messaging client 112 establishing a connection with messaging service 122.

To illustrate step 406, messaging client 112 saves, at offline message database 150, information identifying the root client-side instances of the dBDLs for the messages as depicted in discussion thread 310. Messaging client 112 may save this information when the client-side instances of the dBDLs are saved at offline message database 150. Information identifying the root instance of a dBDL may be, but is not limited to, a unique instance identifier of the root instance of the dBDL, a hash identifier created by hashing one or more pieces of metadata in the root instance of the dBDL, or a hash identifier created by hashing the entire dBDL including state information stored in metadata, such as timestamps, locations, etc. The information identifying the root instance of a dBDL is referred to herein as a root identifier.

Messaging client 112 compares the root identifier for message 210 of discussion thread 310 (which is the last state of the discussion thread that was stored at both forum database 140 and offline message database 150) stored at offline message database 150 with information (such as a hash identifier) for the server-side instance of the dBDL for message 210 stored at forum database 140.

If no changes have occurred to the server-side instance of the dBDL for message 210 since the connection was lost between messaging client 112 and messaging service 122, then the root identifier for message 210 stored at offline message database 150 will match the information for the server-side instance of the dBDL for message 210 stored at forum database 140, and there is no conflict for message 210. According to an implementation, in the absence of a conflict, messaging client 112 causes messaging service 122 to update forum database 140 to include blue flag 324 in the metadata of the server-side instance of the dBDL for message 210.

Messaging client 112 also compares the root identifier for draft message 322 (which is draft message 312 of discussion thread 310) with information for the server-side instance of the dBDL for draft message 312 stored at forum database 140. As described in connection with message 210, if no conflict is identified for draft message 322, then messaging client 112 causes messaging service 122 to update the server-side instance of the dBDL for draft message 312 to reflect the changes depicted in draft message 322.

However, if the root identifier for any message in discussion thread 320 does not match information for the server-side instance of the corresponding dBDL, then messaging client 112 identifies a conflict for the message.

The following is an illustration of a situation that would cause the root identifier for draft message 322 to not match information for the server-side instance of the corresponding dBDL. After making the changes to offline message database 150 reflected in discussion thread 320 (while messaging client 112 was not connected to messaging service 122) and before messaging client 112 has communicated those changes to messaging service 122, the user authenticates with messaging service 122 using client device 160. Messaging client 162 of client device 160 retrieves update information for discussion thread 310 from messaging service 122, which does not reflect the changes that the user made in discussion thread 320.

The user makes different changes to discussion thread 310, which are depicted in discussion thread 330. Specifically, the user changes the text of draft message 312 to state "I'm having trouble with problems 2 and 3.", as depicted in draft message 332. The user saves the draft while online, which updates the server-side instance of the dBDL of draft message 312, stored at forum database 140, to be draft message 332. The user also adds a yellow flag 334 to the metadata of message 210 and does not add a blue flag to the metadata of message 210 (as depicted in discussion thread 330). This new metadata is also saved in the server-side instance of the dBDL for message 210 at forum database 140.

Messaging client 112 of client device 110 connects to messaging service 122 after the edits reflected in discussion thread 330 are committed to forum database 140 and attempts to synchronize the changes stored at offline message database 150 depicted in discussion thread 320 with the data for the discussion thread stored at forum database 140 depicted in discussion thread 330. However, the root client-side instances of the dBDLs for draft message 312 and for message 210 will not match the server-side instances of those dBDLs since discussion thread 310 (which is the root of discussion thread 320) is different than discussion thread 330 that is committed to forum database 140.

At step 408, in response to determining that a conflict has occurred because the information for the server-side instance of the dBDL does not match the information for the root client-side instance of the dBDL, a particular resolution action, of a plurality of available resolution actions is selected, based, at least in part, on state information. The state information that may be used to select the appropriate resolution action is described in greater detail hereafter.

For example, messaging client 112 determines that the root identifier for one or more messages in discussion thread 320 stored at offline message database 150 does not match information for the server-side instances of the corresponding dBDLs stored at forum database 140 (e.g., which stores discussion thread 330), indicating a conflict for the at least one message. There are various resolution actions that messaging client 112 can select to resolve the conflict, including at least changing the server-side instance of the dBDL to match the modified client-side instance of the dBDL, and leaving the server-side instance of the dBDL unchanged.

Conflict Resolution Based on User State Information

According to an embodiment, messaging client 112 selects a resolution action based, at least in part, on state information associated with a user that made the changes. State information associated with a user may include a geographic location of the user when the user made the changes to the modified client-side instance of the dBDL, a user type associated with the user, etc.

For example, messaging client 112 may track where a user is when the user makes changes to client-side dBDLs. Based on this information, the system may select a location-specific resolution action. For example, if the conflict is between an offline change the user made in location X, and another offline change the user made in location Y, the change made in location X may win.

As another example, the messaging client may determine that the user is located at a particular geographic location a certain percentage of instances where offline changes are made. This determination may be based on data that messaging client 112 has gathered, or may be based on information available in a profile for the user that is accessible by messaging client 112. Any and all information attributed to a user or a client device may be available in such a user profile, or based on data that messaging client 112 has gathered.

According to an embodiment, if the certain percentage of instances where the user makes modifications to dBDLs from a particular geographic location is above a particular threshold and the user made the change to the modified client-side instance of the dBDL for which messaging client 112 identified the conflict (the "conflicted dBDL") at a geographic location that is different from the particular geographic location, then messaging client 112 selects the resolution action of changing the server-side instance of the conflicted dBDL to match the modified client-side instance of the dBDL. The particular geographic location at which a user made the change to the modified client-side instance of the dBDL may be recorded by messaging client 112, e.g., using Global Positioning System (GPS) technology available at client device 110, using the IP address assigned to client device 110, etc.

As a further example, messaging client 112 selects the resolution action based, at least in part, on a user type for the user that made the changes to at least one instance of the conflicted dBDL. For example, if the user that made changes to the modified client-side instance of the dBDL is associated with a "student" user type, messaging client 112 may determine that the resolution action to take is to leave the server-side instance of the dBDL unchanged. Such a policy is simple and, in the case of the online forum being dedicated to education, would result in simple logic for the majority of conflicts occurring in the example online forum.

As another example, if the user that made changes to the modified client-side instance of the dBDL is associated with a "faculty" user type, messaging client 112 may determine that the resolution action to take is to allow the faculty user to choose one of: a) changing the server-side instance of the conflicted dBDL to match the modified client-side instance of the dBDL; b) leaving the server-side instance of the dBDL unchanged; or c) manually editing the server-side instance of the dBDL to include features of the modified client-side instance of the dBDL. In connection with allowing the faculty user to choose a resolution action, messaging client 112 may provide such a user with the server-side instance of the dBDL and the modified client-side instance of the dBDL in a side-by-side comparison at GUI 172. Further, messaging client 112 may provide a faculty user with a redline representation of the dBDL, at GUI 172, showing the differences between the server-side instance of the dBDL and the modified client-side instance of the dBDL.

According to an embodiment, the difference in treatment of a "student"-type user and a "faculty"-type user is based on a hierarchy of the user types. The "student" user type is at a different level in a hierarchy of user types than the "faculty" user type, and therefore, conflict resolution actions for the users of the different types are different. In this embodiment, a user type may be at the same level in the hierarchy of user types as another user type. For example, a "teacher's aide" user type may be at the same level in the hierarchy as the "faculty" user type, and therefore, conflict resolution actions for "teacher's aide"-type users are the same as conflict resolution actions taken for "faculty"-type users.

Selecting a resolution action based on a hierarchy of user types may occur when the most recent changes to the server-side instance of a conflicted dBDL were performed by a different user than the user that performed the changes to the modified client-side instance of the dBDL. To illustrate in the context of FIG. 3, a particular "student"-type user changed the metadata for message 210 in discussion thread 320, which is stored in a modified client-side instance of the dBDL for message 210. Also, a particular "faculty"-type user changed the metadata for message 210 in discussion thread 330, which is stored in a server-side instance of the dBDL for message 210. Messaging client 112 compares the location of the "student" user type, within the user type hierarchy, with the location of a "faculty" user type within the user type hierarchy. Because a "faculty" user type is higher in the example user type hierarchy than a "student" user type, messaging client 112 selects the resolution action to be automatically leaving the server-side instance of the dBDL for message 210 unchanged, effectively throwing out the conflicting changes to message 210 performed by the "student"-type user.

In another example, the "faculty"-type user has performed edits to a modified client-side instance of the conflicted dBDL and a "student"-type user performs edits to the server-side instance of the dBDL. According to an embodiment, because the "faculty" user type is at a higher location in the user hierarchy than the "student" user type, messaging client 112 selects the resolution action to be automatically changing the server-side instance of the dBDL to match the modified client-side instance of the dBDL.

According to this embodiment, if the user type of the user that edits the modified client-side instance of the conflicted dBDL and the user type of the user that edits the server-side instance of the dBDL are at the same level in the hierarchy of user types, then the users are treated as if there were only one user that performed the changes, as described above.

Conflict Resolution Based on Document Instance State Information

Messaging client 112 may also select a resolution action based, at least in part, on state information associated with an instance of the conflicted dBDL. State information associated with an instance of the dBDL may include any information in the text and/or metadata for the message, such as: a timestamp recording the time that an instance of the dBDL was last changed, the text of the message of the document, a subject for the message, a flag associated with the message, a status of the server-side instance of the dBDL (e.g., draft/posted), etc.

For example, messaging client 112 selects the resolution action of leaving the server-side instance of the conflicted dBDL unchanged if the timestamp recording the time that the modified client-side instance of the dBDL was last changed is within a particular range (e.g., from 2:00 am-5:00 am). The particular range for the modification timestamp may be based on usage records for the user, including when the user tends to create or edit messages. To illustrate, if the percentage of instances that the user drafts messages between 7:00 AM and 11:00 PM is over a particular threshold and the user last saved the modified client-side instance between 7:00 AM and 11:00 PM, then messaging client 112 selects the resolution action of changing the server-side instance of the dBDL to match the modified client-side instance of the dBDL. However, in the same situation except that the user last saved the modified client-side instance between 11:00 PM and 7:00 AM, messaging client 112 selects the resolution action of leaving the server-side instance of the dBDL unchanged.

As another example, messaging client 112 selects the resolution action of automatically changing the server-side instance of the conflicted dBDL to match the modified client-side instance of the dBDL if the modified client-side instance of the dBDL has a particular flag associated therewith (e.g., "urgent", "important", "substantive", etc.).

As yet another example, if the status of the server-side instance of the conflicted dBDL is "draft", messaging client 112 may select the resolution action of saving the modified client-side instance of the dBDL as a new dBDL in both offline message database 150 and forum database 140. In this embodiment, the user sees both drafts in the associated discussion thread after messaging client 112 performs the conflict resolution.

As yet another example, if the status of the server-side instance of the conflicted dBDL is "posted", messaging client 112 may automatically modify the metadata in the server-side instance of the conflicted dBDL to include the metadata of the modified client-side instance of the dBDL. Thus, no metadata changes are lost, even if the root client-side instance of the dBDL does not match the server-side instance of the dBDL. According to an embodiment, messaging client 112 first determines whether the metadata in the server-side instance of the dBDL and the metadata in the modified client-side instance of the dBDL are mutually exclusive before modifying the metadata of the server-side instance of the dBDL to include metadata from the modified client-side instance of the dBDL.

Conflict Resolution Based on Client Device State Information

Messaging client 112 may also select a resolution action based, at least in part, on state information associated with the client device on which changes to the conflicted dBDL were made. State information associated with a client device may include one or more of: a type of the client device, a geographic location associated with the client device, an identifier of the client device, an IP and/or MAC address of the client device, information about a network with which the client device is connected, etc.

For example, messaging client 112 identifies a location associated with client device 110 (on which the changes to the conflicted dBDL were made on the client side). In this example, the latest changes to the server-side instance of the dBDL were performed on a different client device. If the location associated with client device 110 is in a list of preferred locations for client devices and a location associated with the different client device is not on the list, then messaging client 112 selects the resolution action to be replacing the server-side instance of the dBDL with the modified client-side instance of the dBDL. A list of preferred locations for client devices may include one or more zip codes (e.g., associated with a university campus that hosts the example online forum), one or more IP addresses and/or MAC addresses, or other information identifying the location of a client device.

As a further example, messaging client 112 selects the resolution action based, at least in part, on a device type for the device on which a user made the changes to at least one instance of the conflicted dBDL. For example, if the device on which a user made changes to the modified client-side instance of the dBDL is associated with a "tablet" device type, messaging client 112 may determine that the resolution action to take is to leave the server-side instance of the dBDL unchanged.

As another example, messaging client 112 selects the resolution action based, at least in part, on information for a network to which the device from which a user made the changes to at least one instance of the conflicted dBDL was connected. To illustrate, if the network used to make changes to the modified client-side instance of the dBDL was a 3G network, messaging client 112 may determine that the resolution action to take is to leave the server-side instance of the dBDL unchanged. However, if the network used to make changes to the modified client-side instance of the dBDL was a WIFI network, messaging client 112 may determine that the resolution action to take is to change the server-side instance of the dBDL to match the modified client-side instance of the dBDL.

Further, messaging client 112 may provide information about a network—on which the change to an instance of the dBDL was made—in connection with giving the user an option of what resolution action to take. According to embodiments of the invention, any of the information described herein, on which messaging client 112 bases decisions of resolution actions to take, may be presented to a user to allow the user to make a more informed decision of what resolution action to take.

As yet another example, if the device on which a user made changes to the modified client-side instance of the dBDL is associated with a "desktop" device type, messaging client 112 may determine that the resolution action to take is to allow the user of the desktop device to choose one of: a) changing the server-side instance of the dBDL for which a conflict is identified to match the modified client-side instance of the dBDL; b) leaving the server-side instance of the dBDL unchanged; or c) manually editing the server-side instance of the dBDL to include features of the modified client-side instance of the dBDL. In connection with allowing the user of the desktop device to choose a resolution action, messaging client 112 may provide the user with the server-side instance of the dBDL and the modified client-side instance of the dBDL in a side-by-side comparison at GUI 172. Further, messaging client 112 may provide the user with a redline representation of the dBDL, at GUI 172, showing the differences between the server-side instance of the dBDL and the modified client-side instance of the dBDL.

According to an embodiment, messaging client 112 may track usage data indicating from what type of device a user performs edits to dBDLs. Messaging client 112 may select resolution actions for the type of client device on which the user performs edits that cause the conflict based, at least in part, on the usage data.

According to an embodiment, the difference in treatment of a "tablet"-type device and a "desktop"-type device is based on a hierarchy of the device types. The "tablet" device type is at a different level in a hierarchy of device types than the "desktop" device type, and therefore, conflict resolution actions for devices of the different types are different. In this embodiment, a device type may be at the same level in the hierarchy of device types as another device type. For example, a "laptop" device type may be at the same level in the hierarchy as the "desktop" device type, and therefore, conflict resolution actions taken for "laptop"-type devices are the same as conflict resolution actions taken for "desktop"-type devices.

Selecting a resolution action based on a hierarchy of device types may occur when the most recent changes to the server-side instance of the conflicted dBDL were performed on a different device than the device on which a user made changes to the modified client-side instance of the dBDL. To illustrate in the context of FIG. 3, a user changed the metadata for message 210 in discussion thread 320, which is stored in a modified client-side instance of the dBDL for message 210, on a particular "tablet"-type device. Also, a user changed the metadata for message 210 in discussion thread 330, which is stored in a server-side instance of the dBDL for message 210, on a particular "desktop"-type device. Messaging client 112 compares the location of the "tablet" device type, within the device type hierarchy, with the location of a "desktop" device type within the device type hierarchy. Because a "desktop" device type is higher in the example device type hierarchy than a "tablet" device type, messaging client 112 selects the resolution action to be automatically leaving the server-side instance of the dBDL for message 210 unchanged.

In another example, a user of a "desktop"-type device has performed edits to a modified client-side instance of the conflicted dBDL and a user of a "tablet"-type device has performed the latest edits to the server-side instance of the dBDL. According to an embodiment, because the "desktop" device type is at a higher location in the device hierarchy than the "tablet" device type, messaging client 112 selects the resolution action to be automatically changing the server-side instance of the dBDL to match the modified client-side instance of the dBDL.

According to this embodiment, if the device type of the client device on which a user edits the modified client-side instance of the conflicted dBDL and the device type of the client device on which a user edits the server-side instance of the dBDL are at the same level in the hierarchy of device types, then the devices are treated as if there were only one device on which the user performed the changes, as described above.

Conflict Resolution

At step 410, the conflict is resolved by performing the particular resolution action. For example, messaging client 112 performs the particular resolution action selected at step 408, including instructing messaging service 122 to replace the server-side instance of the conflicted dBDL with the client-side instance of the dBDL, instructing messaging service 122 to leave the server-side instance of the dBDL unchanged, requesting information from messaging service 122 required to create a display at GUI 172 for the user in connection with the particular resolution action, instructing messaging service 122 to replace the server-side instance of the dBDL with a modified server-side instance of the dBDL, etc. In connection with leaving the server-side instance of the conflicted dBDL unchanged, messaging client 112 may replace the client-side instance of the dBDL with the server-side instance of the dBDL.

Alternate Embodiments

In the embodiments, a dBDL may represent any kind of document that a user can change while messaging client 112 is offline, where the offline changes must be propagated online once messaging client 112 connects to messaging service 122, which may result in a conflict with changes that have occurred in the meantime. Thus, dBDLs are not limited to messages in an online forum.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
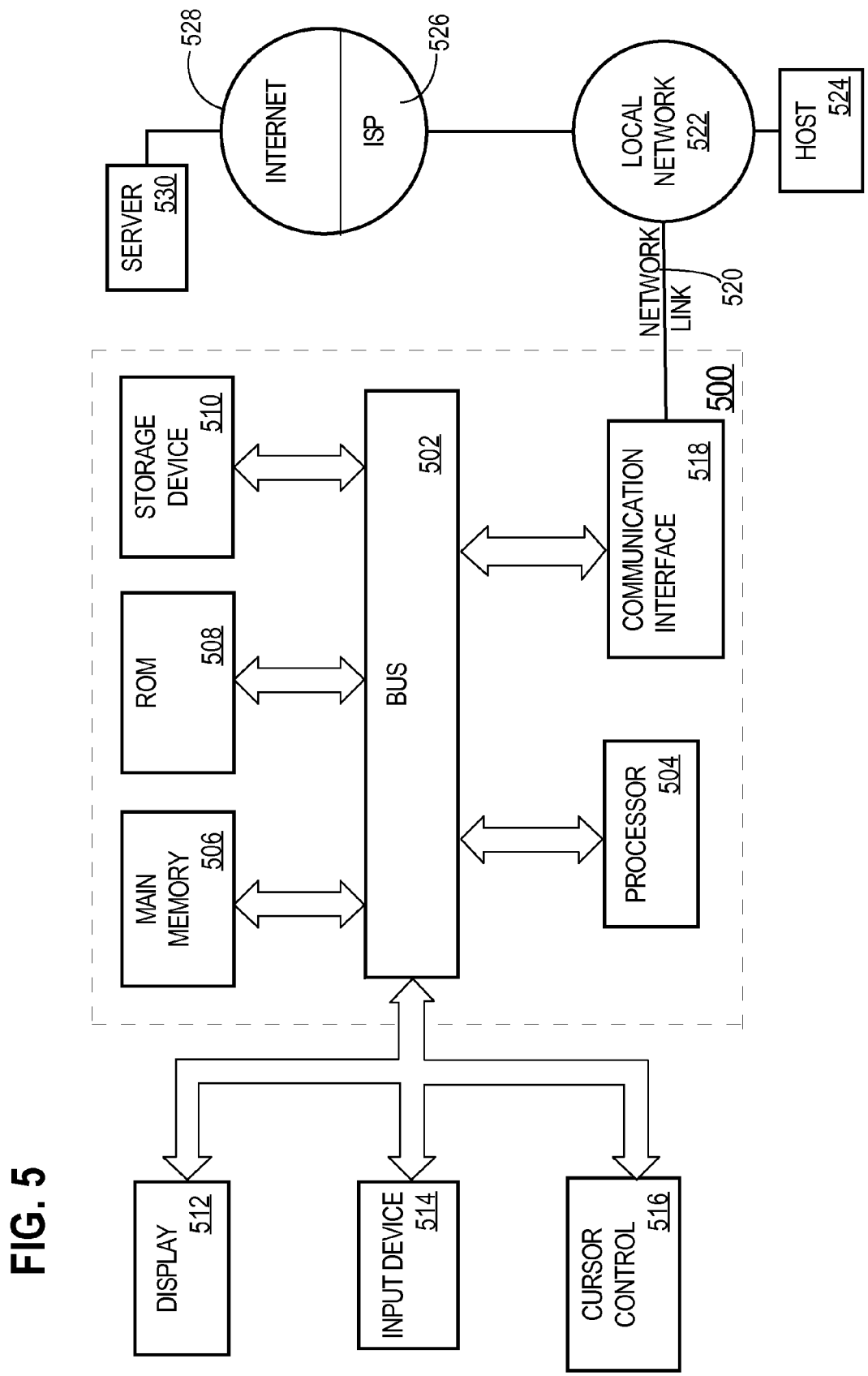
FIG. 5 is a block diagram of a computer system on which embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    a client device saving a root identifier that identifies a root client-side instance of a document bundle;
    wherein the root identifier comprises one or more of:
        a unique instance identifier of the root client-side instance of the document bundle,
        a first hash identifier created by hashing one or more pieces of metadata for the root client-side instance of the document bundle, or
        a second hash identifier created by hashing the entire root client-side instance of the document bundle including state information stored in metadata for the root client-side instance of the document bundle;
    recording, at the client device, one or more changes that are made to the root client-side instance of the document bundle to create a modified client-side instance of the document bundle, wherein the one or more changes were made while the client device was not connected to a remote storage service implemented by one or more computing devices;
    wherein the remote storage service maintains a server-side instance of the document bundle;
    wherein the remote storage service allows multiple client devices to make changes to the server-side instance of the document bundle;
    while the client device is connected to the remote storage service after the one or more changes are recorded, performing the steps of:
        determining, based at least in part on the root identifier, whether a conflict has occurred by determining whether information for the server-side instance of the document bundle matches information for the root client-side instance of the document bundle;
        in response to determining that a conflict has occurred because the information for the server-side instance of the document bundle does not match the information for the root client-side instance of the document bundle, selecting a particular resolution action, of a plurality of available resolution actions, based, at least in part, on at least one of:
            the location of a user type, of a user that made the one or more changes to the modified client-side instance of the document bundle, within a hierarchy of three or more user types,
            state information associated with the modified client-side instance of the document bundle, or
            state information associated with the client device on which the one or more changes to the modified client-side instance of the document bundle were made;
        wherein the plurality of available resolution actions include at least:
            changing the server-side instance of the document bundle to match the modified client-side instance of the document bundle, and
            leaving the server-side instance of the document bundle unchanged; and
        resolving the conflict by performing the particular resolution action.

2. The method of claim 1 wherein the step of selecting comprises selecting the particular resolution action based on where, within the hierarchy of user types, the user type is located.

3. The method of claim 2 wherein:
    the user type is a first user type; and
    the step of selecting the particular resolution action further comprises:
        comparing the location, within the hierarchy, of the first user type with the location, within the hierarchy, of a second user type;
        wherein the second user type is the user type of a second user who caused changes to be made to the server-side instance of the document bundle to cause the server-side instance of the document bundle to no longer match the root client-side instance of the document bundle.

4. The method of claim 3 wherein the step of selecting the particular resolution action further comprises: in response to determining that the first user type is at a higher level in the hierarchy of user types than the second user type, automatically replacing the server-side instance of the document bundle with the modified client-side instance of the document bundle.

5. The method of claim 1, wherein:
    selecting the particular resolution action is based, at least in part, on state information associated with the client device on which the one or more changes to the modified client-side instance of the document bundle were made; and
    the state information used to select the particular resolution action includes data that indicates a first device type of the client device on which the one or more changes were made.

6. The method of claim 5 wherein the step of selecting comprises selecting the particular resolution action based on where, within a hierarchy of device types, the first device type is located.

7. The method of claim 6 wherein the step of selecting the particular resolution action further comprises:
    comparing the location, within the hierarchy of device types, of the first device type with the location, within the hierarchy of device types, of a second device type;
    wherein the second device type is the device type of a second client device on which changes were made to the server-side instance of the document bundle to cause the server-side instance of the document bundle to no longer match the root client-side instance of the document bundle.

8. The method of claim 7 wherein the step of selecting the particular resolution action further comprises: in response to determining that the first device type is at a higher level in the hierarchy of device types than the second device type, automatically replacing the server-side instance of the document bundle with the modified client-side instance of the document bundle.

9. The method of claim 1 wherein:
selecting the particular resolution action is based, at least in part, on state information associated with the client device on which the one or more changes to the modified client-side instance of the document bundle were made; and
the state information used to select the particular resolution action includes data that indicates a geographic location in which the one or more changes were made.

10. The method of claim 1 wherein:
selecting the particular resolution action is based, at least in part, on state information associated with the modified client-side instance of the document bundle; and
the state information used to select the particular resolution action includes data that indicates a time of day that changes were made to an instance of the document bundle.

11. The method of claim 1 wherein determining whether a conflict has occurred is performed automatically in response to the client device establishing a connection with the remote storage service.

12. One or more non-transitory computer-readable media storing one or more sequences of instructions which, when executed by one or more processors, cause:
a client device saving a root identifier that identifies a root client-side instance of a document bundle;
wherein the root identifier comprises one or more of:
a unique instance identifier of the root client-side instance of the document bundle,
a first hash identifier created by hashing one or more pieces of metadata for the root client-side instance of the document bundle, or
a second hash identifier created by hashing the entire root client-side instance of the document bundle including state information stored in metadata for the root client-side instance of the document bundle;
recording, at the client device, one or more changes that are made to the root client-side instance of the document bundle to create a modified client-side instance of the document bundle, wherein the one or more changes were made while the client device was not connected to a remote storage service;
wherein the remote storage service maintains a server-side instance of the document bundle;
wherein the remote storage service allows multiple client devices to make changes to the server-side instance of the document bundle;
while the client device is connected to the remote storage service after the one or more changes are recorded, performing the steps of:
determining, based at least in part on the root identifier, whether a conflict has occurred by determining whether information for the server-side instance of the document bundle matches information for the root client-side instance of the document bundle;
in response to determining that a conflict has occurred because the information for the server-side instance of the document bundle does not match the information for the root client-side instance of the document bundle, selecting a particular resolution action, of a plurality of available resolution actions, based, at least in part, on at least one of:
the location of a user type, of a user that made the one or more changes to the modified client-side instance of the document bundle, within a hierarchy of three or more user types,
state information associated with the modified client-side instance of the document bundle, or
state information associated with the client device on which the one or more changes to the modified client-side instance of the document bundle were made;
wherein the plurality of available resolution actions include at least:
changing the server-side instance of the document bundle to match the modified client-side instance of the document bundle, and
leaving the server-side instance of the document bundle unchanged; and
resolving the conflict by performing the particular resolution action.

13. The one or more non-transitory computer-readable media of claim 12, wherein:
selecting the particular resolution action comprises selecting the particular resolution action based on where, within the hierarchy of user types, the user type is located.

14. The one or more non-transitory computer-readable media of claim 13 wherein:
the user type is a first user type; and
selecting the particular resolution action further comprises:
comparing the location, within the hierarchy, of the first user type with the location, within the hierarchy, of a second user type;
wherein the second user type is the user type of a second user who caused changes to be made to the server-side instance of the document bundle to cause the server-side instance of the document bundle to no longer match the root client-side instance of the document bundle.

15. The one or more non-transitory computer-readable media of claim 14 wherein selecting the particular resolution action further comprises: in response to determining that the first user type is at a higher level in the hierarchy of user types than the second user type, automatically replacing the server-side instance of the document bundle with the modified client-side instance of the document bundle.

16. The one or more non-transitory computer-readable media of claim 12, wherein:
selecting the particular resolution action is based, at least in part, on state information associated with the client device on which the one or more changes to the modified client-side instance of the document bundle were made;
the state information used to select the particular resolution action includes data that indicates a first device type of the client device on which the one or more changes were made; and
selecting the particular resolution action comprises selecting the particular resolution action based on where, within a hierarchy of device types, the first device type is located.

17. The one or more non-transitory computer-readable media of claim 16 wherein selecting the particular resolution action further comprises:
comparing the location, within the hierarchy of device types, of the first device type with the location, within the hierarchy of device types, of a second device type;
wherein the second device type is the device type of a second client device on which changes were made to the server-side instance of the document bundle to cause the server-side instance of the document bundle to no longer match the root client-side instance of the document bundle.

18. The one or more non-transitory computer-readable media of claim 17 wherein selecting the particular resolution action further comprises: in response to determining that the first device type is at a higher level in the hierarchy of device types than the second device type, automatically replacing the server-side instance of the document bundle with the modified client-side instance of the document bundle.

19. The one or more non-transitory computer-readable media of claim 12 wherein:
  selecting the particular resolution action is based, at least in part, on state information; and
  the state information used to select the particular resolution action includes data that indicates at least one of: a) a geographic location in which the one or more changes were made; and b) a time of day that changes were made to an instance of the document bundle.

20. A method comprising:
  a client device saving a root identifier that identifies a root client-side instance of a document bundle;
  wherein the root identifier comprises one or more of:
    a unique instance identifier of the root client-side instance of the document bundle,
    a first hash identifier created by hashing one or more pieces of metadata in the root client-side instance of the document bundle, or
    a second hash identifier created by hashing the entire root client-side instance of the document bundle including state information stored in metadata for the root client-side instance of the document bundle;
  recording, at the client device, one or more changes that are made to the root client-side instance of the document bundle to create a modified client-side instance of the document bundle, wherein the one or more changes were made while the client device was not connected to a remote storage service implemented by one or more computing devices;
  wherein the remote storage service maintains a server-side instance of the document bundle;
  wherein the remote storage service allows multiple client devices to make changes to the server-side instance of the document bundle;
  while the client device is connected to the remote storage service after the one or more changes are recorded, performing the steps of:
    determining, based at least in part on the root identifier, whether a conflict has occurred by determining whether information for the server-side instance of the document bundle matches information for the root client-side instance of the document bundle;
    in response to determining that a conflict has occurred because the information for the server-side instance of the document bundle does not match the information for the root client-side instance of the document bundle:
      identifying a first attribute value that is associated with a particular attribute of first state information for the modified client-side instance of the document bundle,
      wherein the first attribute value of the particular attribute of the first state information describes at least one of:
        the modified client-side instance of the document bundle, or
        the client device on which the one or more changes to the modified client-side instance of the document bundle were made,
      identifying a second attribute value that is associated with the particular attribute of second state information for the server-side instance of the document bundle,
      wherein the particular attribute of the second state information corresponds to the particular attribute of the first state information, and
      wherein the second attribute value of the particular attribute of the second state information describes at least one of:
        the server-side instance of the document bundle, or
        the client device on which changes to the server-side instance of the document bundle were made,
      determining that a position of the first attribute value is higher, in a hierarchy of attribute values for the particular attribute, than a position of the second attribute value in the hierarchy, and
      based, at least in part, on determining that the position of the first attribute value is higher, in the hierarchy, than the position of the second attribute value, selecting a particular resolution action of a plurality of available resolution actions; and
    resolving the conflict by performing the particular resolution action.

21. A method comprising:
  a client device saving a root identifier that identifies a root client-side instance of a document bundle;
  wherein the root identifier comprises one or more of:
    a unique instance identifier of the root client-side instance of the document bundle,
    a first hash identifier created by hashing one or more pieces of metadata for the root client-side instance of the document bundle, or
    a second hash identifier created by hashing the entire root client-side instance of the document bundle including state information stored in metadata for the root client-side instance of the document bundle;
  recording, at the client device, one or more changes that are made to the root client-side instance of the document bundle to create a modified client-side instance of the document bundle, wherein the one or more changes were made while the client device was not connected to a remote storage service implemented by one or more computing devices;
  wherein the remote storage service maintains a server-side instance of the document bundle;
  wherein the remote storage service allows multiple client devices to make changes to the server-side instance of the document bundle;
  while the client device is connected to the remote storage service after the one or more changes are recorded, performing the steps of:
    determining, based at least in part on the root identifier, whether a conflict has occurred by determining whether information for the server-side instance of the document bundle matches information for the root client-side instance of the document bundle;
    in response to determining that a conflict has occurred because the information for the server-side instance of the document bundle does not match the information for the root client-side instance of the document bundle:
      determining whether a particular attribute value, of a particular attribute of state information for the modified client-side instance of the document bundle, conforms to a historical trend for values of the particular attribute of state information for the modified client-side instance of the document bundle,
wherein the particular attribute value of the particular attribute of state information describes at least one of:
a user that made the one or more changes to the modified client-side instance of the document bundle,
the modified client-side instance of the document bundle, or
the client device on which the one or more changes to the modified client-side instance of the document bundle were made,
based, at least in part, on determining that the particular attribute value conforms to the historical trend for values of the particular attribute of state information for the modified client-side instance of the document bundle, selecting a particular resolution action, of a plurality of available resolution actions,
wherein the plurality of available resolution actions include at least:
changing the server-side instance of the document bundle to match the modified client-side instance of the document bundle, and
leaving the server-side instance of the document bundle unchanged; and
resolving the conflict by performing the particular resolution action.

22. The method of claim 21 wherein:
the particular attribute of state information describes a user that made the one or more changes to the modified client-side instance of the document bundle; and
determining whether the particular attribute value conforms to the historical trend for values of the particular attribute comprises:
determining whether a percentage of instances of the particular attribute value, in historical data, is above a particular threshold percentage.

23. The method of claim 22 wherein the particular attribute is geographic location at which the user makes modifications to the document bundle.

24. The method of claim 21 wherein:
the particular attribute of state information describes the modified client-side instance of the document bundle; and
determining whether the particular attribute value conforms to the historical trend for values of the particular attribute comprises:
determining whether the particular attribute value is within a particular value range.

25. The method of claim 24 further comprising selecting the particular value range based, at least in part, on determining that a percentage of values of the particular attribute, that occur within the particular value range, is above a particular threshold.

26. One or more non-transitory computer-readable media storing one or more sequences of instructions which, when executed by one or more processors, cause:
a client device saving a root identifier that identifies a root client-side instance of a document bundle;
wherein the root identifier comprises one or more of:
a unique instance identifier of the root client-side instance of the document bundle,
a first hash identifier created by hashing one or more pieces of metadata in the root client-side instance of the document bundle, or
a second hash identifier created by hashing the entire root client-side instance of the document bundle including state information stored in metadata for the root client-side instance of the document bundle;
recording, at the client device, one or more changes that are made to the root client-side instance of the document bundle to create a modified client-side instance of the document bundle, wherein the one or more changes were made while the client device was not connected to a remote storage service;
wherein the remote storage service maintains a server-side instance of the document bundle;
wherein the remote storage service allows multiple client devices to make changes to the server-side instance of the document bundle;
while the client device is connected to the remote storage service after the one or more changes are recorded, performing the steps of:
determining, based at least in part on the root identifier, whether a conflict has occurred by determining whether information for the server-side instance of the document bundle matches information for the root client-side instance of the document bundle; and
in response to determining that a conflict has occurred because the information for the server-side instance of the document bundle does not match the information for the root client-side instance of the document bundle:
identifying a first attribute value that is associated with a particular attribute of first state information for the modified client-side instance of the document bundle,
wherein the first attribute value of the particular attribute of the first state information describes at least one of:
the modified client-side instance of the document bundle, or
the client device on which the one or more changes to the modified client-side instance of the document bundle were made,
identifying a second attribute value that is associated with the particular attribute of second state information for the server-side instance of the document bundle,
wherein the particular attribute of the second state information corresponds to the particular attribute of the first state information, and
wherein the second attribute value of the particular attribute of the second state information describes at least one of:
the server-side instance of the document bundle, or
the client device on which changes to the server-side instance of the document bundle were made,
determining that a position of the first attribute value is higher, in a hierarchy of attribute values for the particular attribute, than a position of the second attribute value in the hierarchy, and
based, at least in part, on determining that the position of the first attribute value is higher, in the hierarchy, than the position of the second attribute value, selecting a particular resolution action of a plurality of available resolution actions; and
resolving the conflict by performing the particular resolution action.

27. One or more non-transitory computer-readable media storing one or more sequences of instructions which, when executed by one or more processors, cause:
- a client device saving a root identifier that identifies a root client-side instance of a document bundle;
- wherein the root identifier comprises one or more of:
  - a unique instance identifier of the root client-side instance of the document bundle,
  - a first hash identifier created by hashing one or more pieces of metadata for the root client-side instance of the document bundle, or
  - a second hash identifier created by hashing the entire root client-side instance of the document bundle including state information stored in metadata for the root client-side instance of the document bundle;
- recording, at the client device, one or more changes that are made to the root client-side instance of the document bundle to create a modified client-side instance of the document bundle, wherein the one or more changes were made while the client device was not connected to a remote storage service;
- wherein the remote storage service maintains a server-side instance of the document bundle;
- wherein the remote storage service allows multiple client devices to make changes to the server-side instance of the document bundle;
- while the client device is connected to the remote storage service after the one or more changes are recorded, performing the steps of:
  - determining, based at least in part on the root identifier, whether a conflict has occurred by determining whether information for the server-side instance of the document bundle matches information for the root client-side instance of the document bundle;
  - in response to determining that a conflict has occurred because the information for the server-side instance of the document bundle does not match the information for the root client-side instance of the document bundle:
    - determining whether a particular attribute value, of a particular attribute of state information for the modified client-side instance of the document bundle, conforms to a historical trend for values of the particular attribute of state information for the modified client-side instance of the document bundle,
    - wherein the particular attribute value of the particular attribute of state information describes at least one of:
      - a user that made the one or more changes to the modified client-side instance of the document bundle,
      - the modified client-side instance of the document bundle, or
      - the client device on which the one or more changes to the modified client-side instance of the document bundle were made,
    - based, at least in part, on determining that the particular attribute value conforms to the historical trend for values of the particular attribute of state information for the modified client-side instance of the document bundle, selecting a particular resolution action, of a plurality of available resolution actions,
    - wherein the plurality of available resolution actions include at least:
      - changing the server-side instance of the document bundle to match the modified client-side instance of the document bundle, and
      - leaving the server-side instance of the document bundle unchanged; and
  - resolving the conflict by performing the particular resolution action.

28. The one or more non-transitory computer-readable media of claim 27 wherein:
- the particular attribute of state information describes a user that made the one or more changes to the modified client-side instance of the document bundle; and
- determining whether the particular attribute value conforms to the historical trend for values of the particular attribute comprises:
  - determining whether a percentage of instances of the particular attribute value, in historical data, is above a particular threshold percentage.

29. The one or more non-transitory computer-readable media of claim 28 wherein the particular attribute is geographic location at which the user makes modifications to the document bundle.

30. The one or more non-transitory computer-readable media of claim 27 wherein:
- the particular attribute of state information describes the modified client-side instance of the document bundle; and
- determining whether the particular attribute value conforms to the historical trend for values of the particular attribute comprises:
  - determining whether the particular attribute value is within a particular value range.

31. The one or more non-transitory computer-readable media of claim 30 further comprising instructions which, when executed by one or more processors, cause selecting the particular value range based, at least in part, on determining that a percentage of values of the particular attribute, that occur within the particular value range, is above a particular threshold.

* * * * *